United States Patent [19]

Okuda et al.

[11] Patent Number: 5,144,428
[45] Date of Patent: Sep. 1, 1992

[54] METHOD AND APPARATUS FOR DECODING IMAGE SIGNALS USING TWO PROCESSING MODES

[75] Inventors: Hidenori Okuda; Shigeki Masaki, both of Kanagawa, Japan

[73] Assignee: Nippon Telegraph and Telephone Corporation, Tokyo, Japan

[21] Appl. No.: 745,184

[22] Filed: Aug. 15, 1991

[30] Foreign Application Priority Data

Aug. 16, 1990 [JP] Japan .................................. 2-216664

[51] Int. Cl.⁵ .............................................. H04N 7/13
[52] U.S. Cl. .................................................. 358/136
[58] Field of Search ................................ 358/136, 135

[56] References Cited

U.S. PATENT DOCUMENTS 4,792,851 12/1988 Mochizuki .......................... 358/136

OTHER PUBLICATIONS

NTT Human Interface Laboratories, pp. 7–12, Mar. 1990, Hidenori Okuda, et al., "A Decoding Scheme for Multiple Video Signals" D-262.
ITEJ Technical Report, vol. 14, No. 35, pp. 11–16, ICS'90-45, AIPS' 90-37, Jun. 28, 1990, Hidenori Okuda, et al., "A Decoding Scheme for Multiple Pictures".
NTT Human Interface Laboratories, pp. 6–238, Sep. 1990, Hidenoriokuda, et al., D-236, "A Decoding Scheme Based on CIM".
NTT Human Interface Laboratories, Jun. 23, 1991, pp. 1–5, Hidenori Okuda, et al., "A Concurrent Decoding Scheme for Multiple Motion Videos".

Primary Examiner—Victor R. Kostak
Attorney, Agent, or Firm—Oblon, Spivak, McClelland, Maier & Neustadt

[57] ABSTRACT

A method and an apparatus for decoding image signals capable of achieving a reproduction of the image signals with a high image quality by using a relatively low speed inverse orthogonal transform device. In the apparatus, interframe difference information is integrated by using the orthogonal transform coefficients for the interframe differential signals recovered from the input encoded signals in order to reproduce the image signals, which is carried out in one of two processing modes including: a first processing mode for applying an inverse orthogonal transform to the orthogonal transform coefficients in order to recover the interframe differential signals, and then integrating the interframe difference information by using the recovered interframe differential signals on a pel domain defined in terms of picture elements, in a case where a number of input blocks per unit time in the input encoded signals is less than a prescribed threshold value; and a second processing mode for integrating the interframe difference information by using the orthogonal transform coefficients on a transformed domain defined in terms of the orthogonal transform coefficients, in a case where the number of input blocks per unit time in the input encoded signals is not less than a prescribed threshold value.

20 Claims, 6 Drawing Sheets

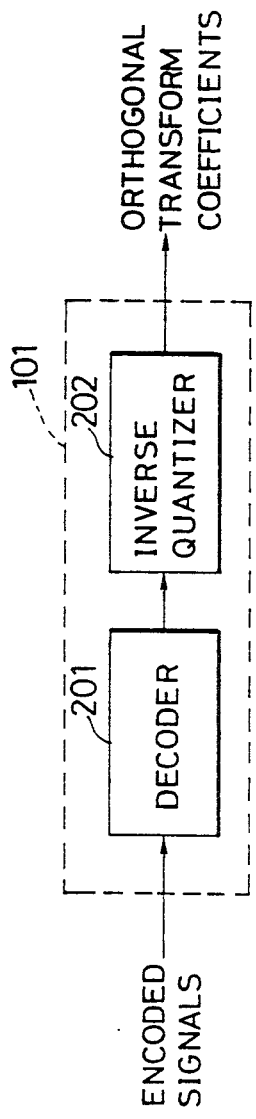
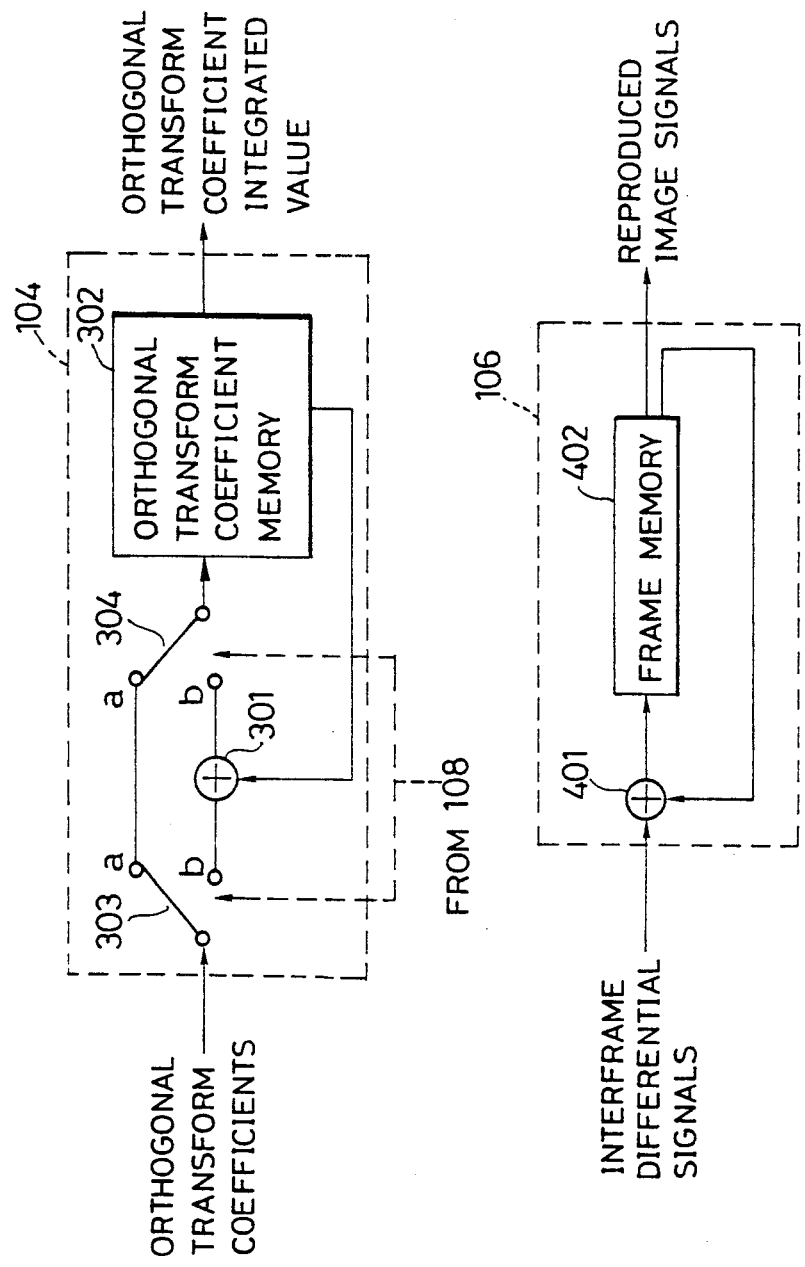
FIG. 5
FIG. 6
FIG. 7

| BLOCK NAME | PROCESSING MODE |
|---|---|
| BLOCK 1 | 0 |
| BLOCK 2 | 1 |
| BLOCK 3 | 0 |
| BLOCK 4 | 0 |
| BLOCK 5 | 0 |
| BLOCK 6 | 0 |
| BLOCK 7 | 1 |
| BLOCK 8 | 1 |
| BLOCK 9 | 0 |
| BLOCK 10 | 0 |
| BLOCK 11 | 0 |
| BLOCK 12 | 0 |

METHOD AND APPARATUS FOR DECODING IMAGE SIGNALS USING TWO PROCESSING MODES

BACKGROUND OF THE INVENTION

1. Field of the Invention

The present invention relates to a method and an apparatus for decoding the image signals encoded by using the orthogonal transform of the interframe differential signals.

2. Description of the Background Art

As a method of encoding image signals, there is a method which utilizes the orthogonal transform of the interframe differential signals of the image signals.

An example of a conventional image signal encoding apparatus using this method is shown in FIG. 1, where the encoding apparatus comprises: a subtractor 601 to which the input image signals are entered; an orthogonal transform device 602 connected with the subtractor 601; a quantizer 603 connected with the orthogonal transform device 602; an inverse quantizer 604 connected with the quantizer 603; an inverse orthogonal transform device 605 connected with the inverse quantizer 604; an adder 606 connected with the inverse orthogonal transform device 605; a frame memory 607 connected with the adder 606 through a switch 611; an encoder 608 connected with the quantizer 603, from which the encoded signals are outputted to a signal transmission line through a switch 610; a significance judgement device 609 connected with the subtractor 601, which controls the switches 610 and 611.

In this image signal encoding apparatus, the interframe differential signals are obtained by the subtractor 601 by subtracting the preceding frame image signals memorized in the frame memory 607 from the input image signals.

Then, the significance judgement device 609 determines each block within the frame as either one of a significant block or an insignificant block by evaluating the size of the interframe differential signals obtained by the subtractor 601 according to a prescribed evaluation algorithm. Each block is determined as the significant block when the size of the interframe differential signals is evaluated to be greater than a predetermined significant level according to the prescribed evaluation algorithm, whereas otherwise the block is determined as the insignificant block.

When a block is determined as the significant block, the significance judgement device 609 closes the switches 610 and 611, whereas when a block is determined as the insignificant block, the significance judgement device 609 opens the switches 610 and 611.

On the other hand, the orthogonal transform device 602 applies the orthogonal transform to the interframe differential signals obtained by the subtractor 601 to obtain the orthogonal transform coefficients.

Then, the quantizer 603 quantizes the orthogonal transform coefficients obtained by the orthogonal transform device 602, and the encoder 608 encodes the quantized orthogonal transform coefficients obtained by the quantizer 603 to obtain the encoded signals.

When the switch 610 is closed by the significance judgement device 609, the encoded signals obtained by the encoder 608 are outputted to a signal transmission line, whereas when the switch 610 is opened by the significance judgement device 609, the encoded signals obtained by the encoder 608 are discarded.

Meanwhile, the quantized orthogonal transform coefficients obtained by the quantizer 603 are entered into a decoding loop in which the inverse quantizer 604 inversely quantizes the quantized orthogonal transform coefficients so as to recover the orthogonal transform coefficients, and the inverse orthogonal transform device 605 applies the inverse orthogonal transform to the recovered orthogonal transform coefficients so as to recover the interframe differential signals.

Then, the adder 606 adds the recovered interframe differential signals and the preceding frame image signals memorized in the frame memory 607 so as to reproduce the current frame image signals. When the switch 611 is closed by the significance judgement device 609, the current frame image signals obtained by the adder 606 are entered into the frame memory 607 over the preceding frame image signals so as to be memorized in the frame memory 607 as the new preceding frame image signals to be utilized in the subsequent encoding operation of the input image signals for the next frame.

In this method of encoding image signals, a number of blocks to be decoded which are transmitted through the signal transmission line to an image signal decoding apparatus, i.e., a number of significant blocks in the encoding apparatus, varies in time according to the size of the dynamical changes appearing in the images to be encoded.

An example of a conventional image signal decoding apparatus for decoding the encoded signals obtained by the image signal encoding apparatus of FIG. 1 is shown in FIG. 2, where the decoding apparatus comprises: a decoder 701 to which the encoded signals are entered; an inverse quantizer 702 connected with the decoder 701; an inverse orthogonal transform device 703 connected with the inverse quantizer 702; an adder 704 connected with the inverse orthogonal transform device 703, from which the reproduced image signals are outputted; and a frame memory 705 connected with the adder 704.

In this image signal decoding apparatus, the decoder 701 decodes the encoded signals received from the image signal encoding apparatus through the signal transmission line so as to recover the quantized orthogonal transform coefficients, the inverse quantizer 702 inversely quantizes the quantized orthogonal transform coefficients so as to recover the orthogonal transform coefficients, and the inverse orthogonal transform device 703 applies the inverse orthogonal transform to the recovered orthogonal transform coefficients so as to recover the interframe differential signals.

Then, the adder 704 adds the recovered interframe differential signals and the preceding frame image signals memorized in the frame memory 705 so as to reproduce the current frame image signals. The current frame image signals obtained by the adder 704 are entered into the frame memory 705 over the preceding frame image signals so as to be memorized in the frame memory 705 as the new preceding frame image signals to be utilized in the subsequent decoding operation of the encoded signals for the next frame.

In this image signal decoding apparatus, the integration of the information on the interframe differences is carried out in the pel (picture element) domain, just as in the decoding loop in the image signal encoding apparatus of FIG. 1.

As a consequence, an error due to the difference between the mode of the integration of the information on the interframe differences in the decoding loop of the image signal encoding apparatus and in the image signal decoding apparatus can be avoided when the image signal decoding apparatus of FIG. 2 is used in decoding the encoded signals obtained by the image signal encoding apparatus of FIG. 1.

However, in this image signal decoding apparatus of FIG. 2, it is necessary to apply the inverse orthogonal transform to every encoded signal entered through the signal transmission line in order to achieve the integration of the information on the interframe differences. Yet, as already mentioned above, a number of blocks to be decoded which are transmitted through the signal transmission line to an image signal decoding apparatus varies in time according to the size of the dynamical changes appearing in the image contents encoded by the image signal encoding apparatus of FIG. 1, so that it is necessary in this image signal decoding apparatus of FIG. 2 to employ a high speed inverse orthogonal transform device capable of dealing with the peak value of the number of input blocks entering through the signal transmission line.

On the other hand, in a case the number of input blocks is significantly less than the peak value, it is quite unnecessary to fully utilize a high processing capability of such a high speed inverse orthogonal transform device, so that the processing operation in the image signal decoding apparatus with a high speed inverse orthogonal transform device is rather inefficient.

Another example of a conventional image signal decoding apparatus for decoding the encoded signals obtained by the image signal encoding apparatus of FIG. 1, which utilizes the image signal decoding method disclosed in Japanese Patent Application No. 2-46661, is shown in FIG. 3 where the decoding apparatus comprises: a decoder 801 to which the encoded signals are entered; an inverse quantizer 802 connected with the decoder 801; an adder 803 connected with the inverse quantizer 802; an inverse orthogonal transform device 804 connected with the adder 803, from which the reproduced image signals are outputted; an orthogonal transform coefficient memory 805 connected with the adder 803; and an inverse orthogonal transform device controller 806 to which the encoded signals are also entered, and which controls the inverse orthogonal transform device 804.

In this image signal decoding apparatus, the decoder 801 decodes the encoded signals received from the image signal encoding apparaus through the signal transmission line so as to recover the quantized orthogonal transform coefficients, and the inverse quantizer 802 inversely quantizes the quantized orthogonal transform coefficients so as to recover the orthogonal transform coefficients.

Then, the adder 803 adds the recovered orthogonal transform coefficients and the integrated orthogonal transform coefficients memorized in the orthogonal transform coefficient memory 805 in order to obtain the new integrated orthogonal transform coefficients which are subsequently entered into the orthogonal transform coefficient memory 805 over the previous integrated orthogonal transform coefficients so as to update the integrated orthogonal transform coefficients memorized in the orthogonal transform coefficient memory 805. The orthogonal transform coefficient memory 805 has a capacity to memorize the orthogonal transform coefficients corresponding to one frame of the image to be decoded.

On the other hand, the inverse orthogonal transform device controller 806 monitors a number of input blocks entering through the signal transmission line per unit time, and activates the inverse orthogonal transform device 804 when the monitored number of input blocks is less than a prescribed threshold value, such that the inverse orthogonal transform device 804 applies the inverse orthogonal transform to the new integrated orthogonal transform coefficients obtained by the adder 803 so as to reproduce the image signals, whereas when the monitored number of input blocks is greater than the prescribed threshold value, the inverse orthogonal transform device controller 806 stops the operation of the inverse orthogonal transform device 804.

Thus, in this image signal decoding apparatus, the information on the interframe differences is constantly integrated in the transform domain formed on the orthogonal transform coefficient memory 805, regardless of the number of input blocks entering through the signal transmission line.

In this image signal decoding apparatus, the image quality will be temporarily deteriorated while the operation of the inverse orthogonal transform device 804 is stopped, but the reproduction of the image signals can be resumed immediately when the operation of the inverse orthogonal transform device 804 is resumed.

Consequently, it is sufficient in this image signal decoding apparatus of FIG. 3 to employ a relatively low speed inverse orthogonal transform device because the operation of the inverse orthogonal transform device will be stopped whenever the number of input blocks per unit time is excessive.

However, an error due to the difference between the mode of the integration of the information on the interframe differences in the decoding loop of the image signal encoding apparatus and in the image signal decoding apparatus arises when the image signal decoding apparatus of FIG. 3 is used in decoding the encoded signals obtained by the image signal encoding apparatus of FIG. 1, and this error will be accumulated as the operation time of this image signal decoding apparatus progresses, so that the image quality obtainable by the image signals reproduced by this image signal decoding apparatus will steadily deteriorate as the operation time of this image signal decoding apparatus progresses.

Now, in an apparatus for receiving multiple channels of motion video signals such as a multi-point TV conference apparatus, it is necessary to decode the multiple channels of the motion video signals simultaneously. Here, if an exclusively devoted decoder is provided for each one of the multiple channels, the size of the decoding apparatus would have to be practically too large according to the present day VLSI technology. For this reason, it is preferable to share the decoder among a plurality of channels and utilize a concurrent decoding scheme for the decoding operation.

Conventionally, such an apparatus has a decoder simply shared among a plurality of channels, where the decoding operation is carried out for each channel by utilizing the same complete image signal decoding algorithm, so that the burden of the decoding operation for each decoder may have to be increased significantly.

As a consequence, it has conventionally been necessary to reduce the burden of the decoding operation at the decoding apparatus side by either thinning out the picture elements on the encoding apparatus side or selectively transmitting the encoded signals of the fraction of blocks within each frame.

However, in the case of the former, the blurring of the reproduced images due to the reduced number of picture elements occurs. On the other hand, in a case of the latter, the image quality of the reproduced images can be severely deteriorated by the buffer overflow occurring in a case of radical dynamical changes in the image contents such as scene changes in which case only a part of the image information can be transmitted.

SUMMARY OF THE INVENTION

It is therefore an object of the present invention to provide a method and an apparatus for decoding image signals encoded by using the orthogonal transform of the interframe differential signals capable of achieving a reproduction of the image signals with a high image quality by using a relatively low speed inverse orthogonal transform device.

It is another object of the present invention to provide a method and an apparatus for decoding image signals encoded by using the orthogonal transform of the interframe differential signals capable of avoiding the deterioration of the image quality due to the discarding of a part of the encoded signals even in a case where a decoder is shared among a plurality of channels.

According to one aspect of the present invention there is provided an image signal decoding apparatus for decoding input encoded signals encoded by using an orthogonal transform of interframe differential signals of image signals, comprising: means for recovering orthogonal transform coefficients for the interframe differential signals from the input encoded signals; means for integrating interframe difference information by using the orthogonal transform coefficients for the interframe differential signals recovered by the recovering means in order to reproduce the image signals, the integrating means being capable of operating in two processing modes including: a first processing mode for applying an inverse orthogonal transform to the orthogonal transform coefficients in order to recover the interframe differential signals, and then integrating the interframe difference information by using the recovered interframe differential signals on a pel domain defined in terms of picture elements; and a second processing mode for integrating the interframe difference information by using the orthogonal transform coefficients on a transformed domain defined in terms of the orthogonal transform coefficients; and means for controlling the integrating means to operate in the first processing mode in a case where a number of input blocks per unit time in the input encoded signals is less than a prescribed threshold value, and in the second processing mode in a case where the number of input blocks per unit time in the input encoded signals is not less than a prescribed threshold value.

According to another aspect of the present invention there is provided an image signal decoding method for decoding input encoded signals encoded by using an orthogonal transform of interframe differential signals of image signals, comprising the steps of: recovering orthogonal transform coefficients for the interframe differential signals from the input encoded signals; and integrating interframe difference information by using the orthogonal transform coefficients for the interframe differential signals recovered at the recovering step in order to reproduce the image signals, the integrating step being carried out in one of two processing modes including: a first processing mode for applying an inverse orthogonal transform to the orthogonal transform coefficients in order to recover the interframe differential signals, and then integrating the interframe difference information by using the recovered interframe differential signals on a pel domain defined in terms of picture elements, in a case where a number of input blocks per unit time in the input encoded signals is less than a prescribed threshold value; and a second processing mode for integrating the interframe difference information by using the orthogonal transform coefficients on a transformed domain defined in terms of the orthogonal transform coefficients, in a case where the number of input blocks per unit time in the input encoded signals is not less than a prescribed threshold value.

Other features and advantages of the present invention will become apparent from the following description taken in conjunction with the accompanying drawings.

BRIEF DESCRIPTION OF THE DRAWINGS

FIG. 5 is a detail block diagram of an orthogonal transform coefficient decoding unit in the image signal decoding apparatus of FIG. 4.

FIG. 6 is a detail block diagram of an orthogonal transform coefficient integration unit in the image signal decoding apparatus of FIG. 4.

FIG. 7 is an illustration of an image to be decoded by the image signal decoding apparatus of FIG. 4 showing a relationship between a frame and blocks.

DETAILED DESCRIPTION OF THE PREFERRED EMBODIMENTS

Figure 1:
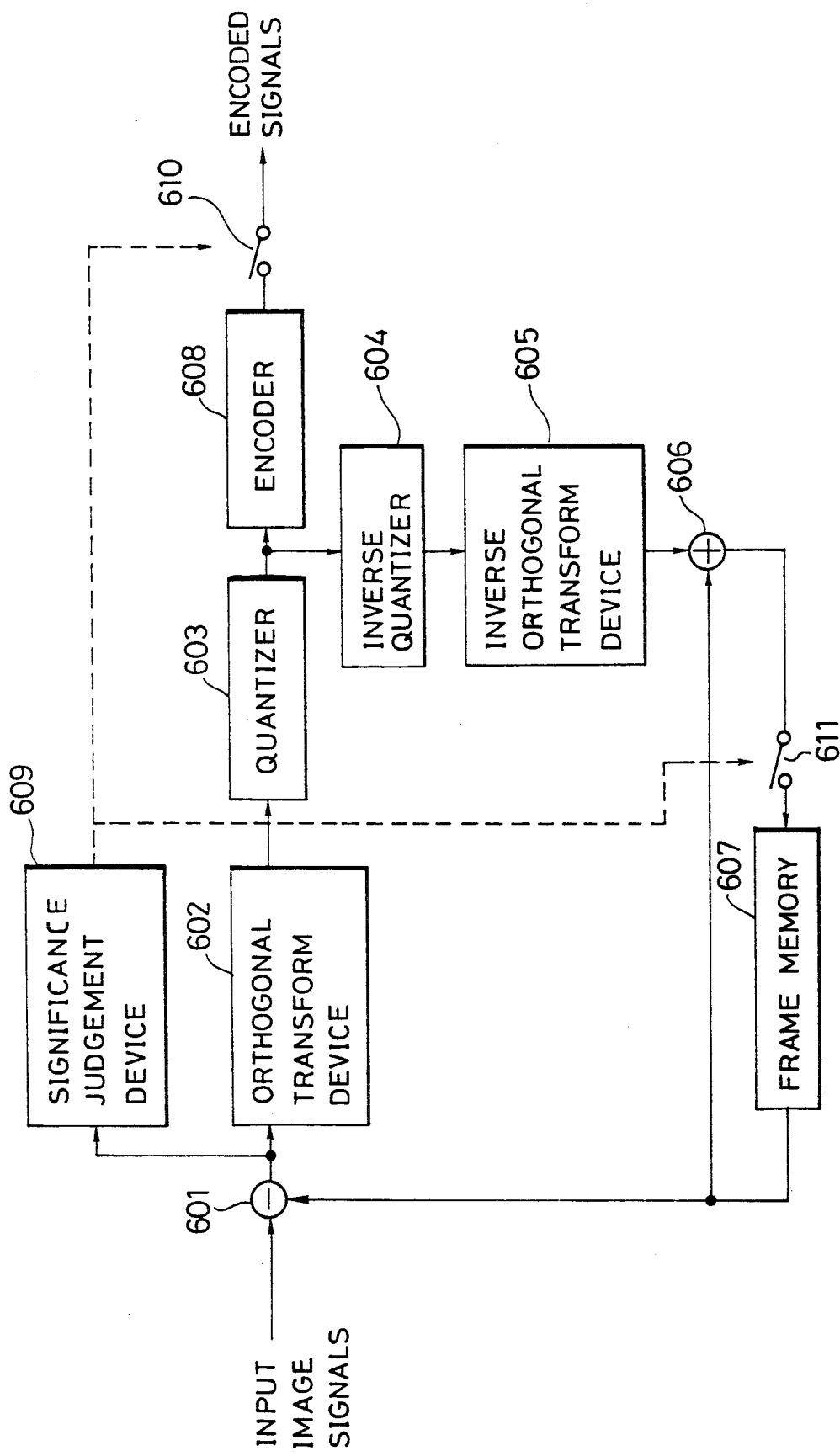
FIG. 1 is a block diagram of an example of a conventional image signal encoding apparatus which utilizes the orthogonal transform of the interframe differential signals.
Figure 2:
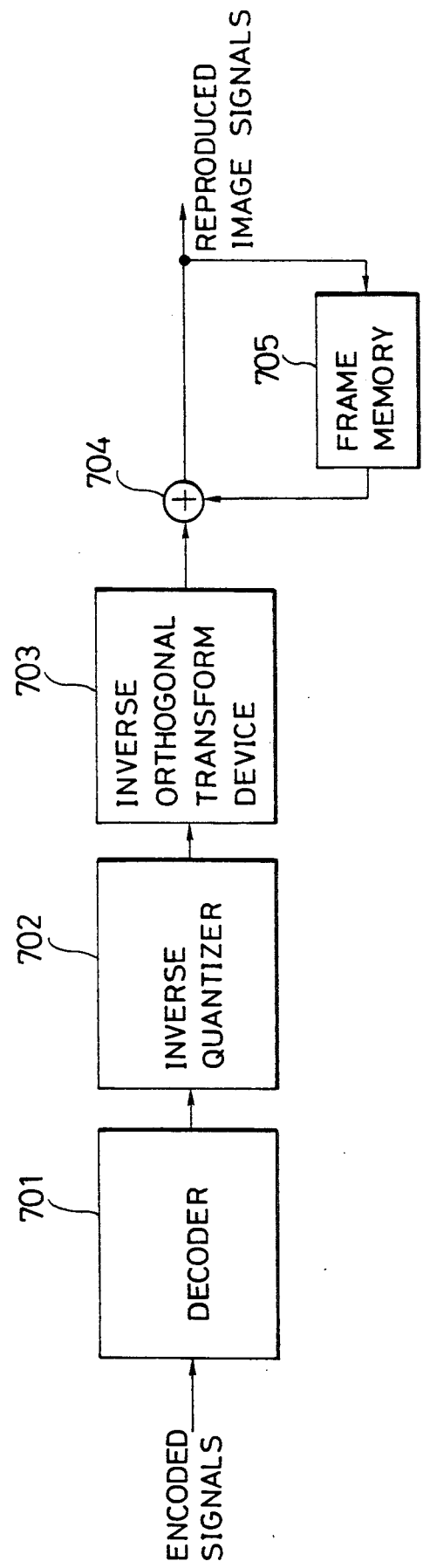
FIG. 2 is a block diagram of an example of a conventional image signal decoding apparatus for decoding the encoded signals obtained by the image signal encoding apparatus of FIG. 1.
Figure 3:
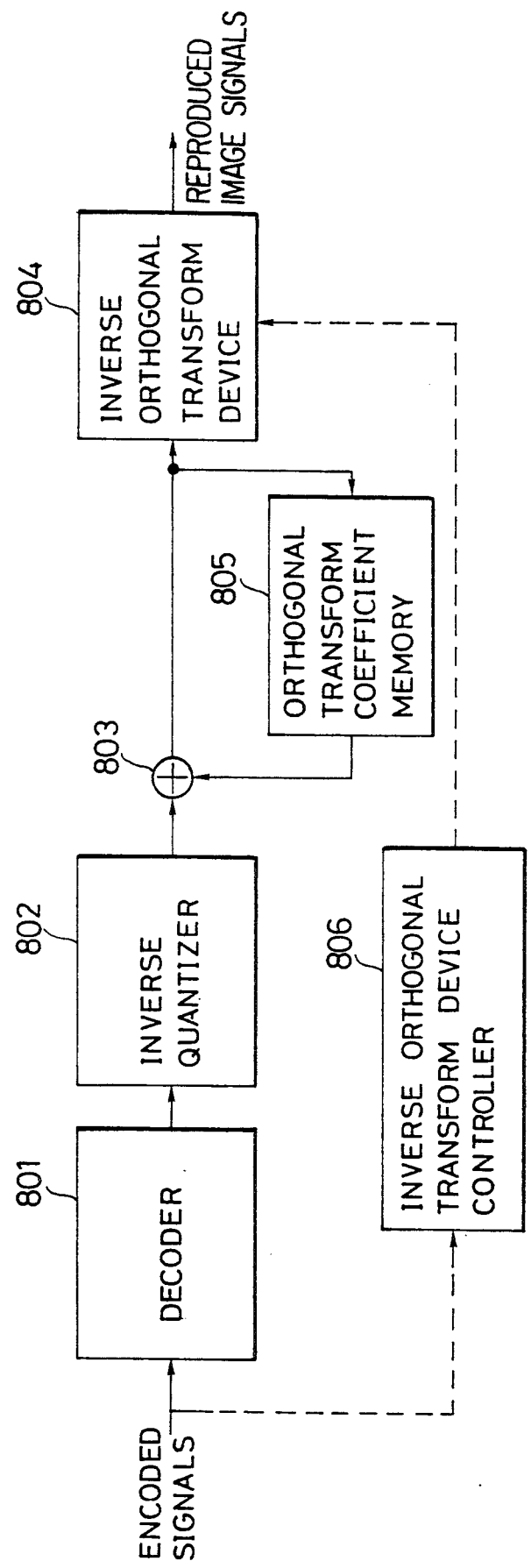
FIG. 3 is a block diagram of another example of a conventional image signal decoding apparatus for decoding the encoded signals obtained by the image signal encoding apparatus of FIG. 1.
Figure 4:
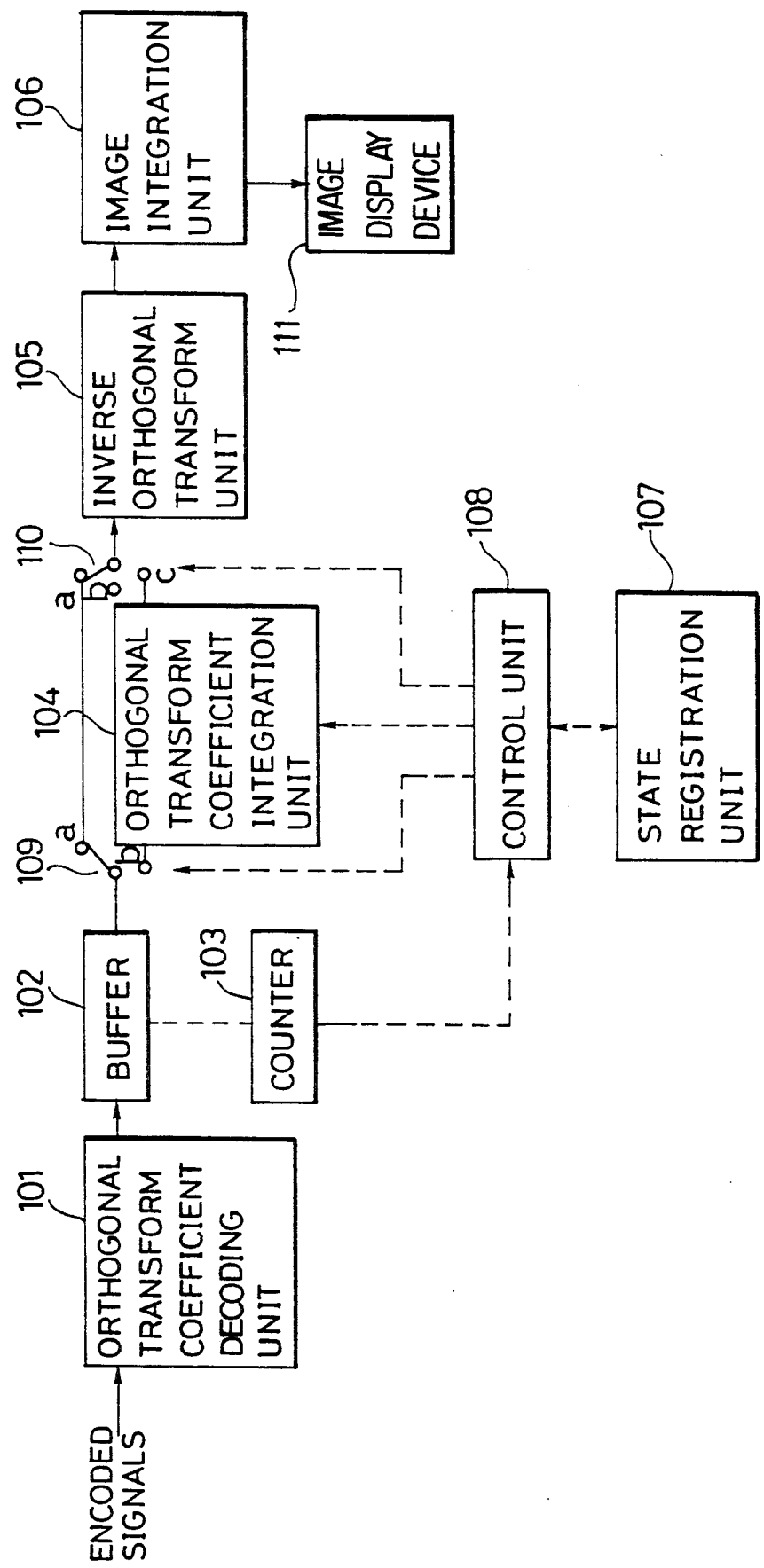
FIG. 4 is a block diagram of one embodiment of an image signal decoding apparatus according to the present invention.

Referring now to FIG. 4, one embodiment of an image signal decoding apparatus according to the present invention will be described in detail.

This image signal decoding apparatus comprises: an orthogonal transform coefficient decoding unit 101 to which the encoded signals are entered; a buffer 102 connected with the orthogonal transform coefficient recovering unit 101; a counter 103 connected with the buffer 102; an orthogonal transform coefficient integration unit 104 that can be connected with the buffer 102 through a switch 109; an inverse orthogonal transform unit 105 that can be connected with either the orthogonal transform coefficient integration unit 104 through a switch 110 or the buffer 102 through the switches 109 and 110; an image integration unit 106 connected with the inverse orthogonal transform unit 105; a control unit 108 connected with the counter 103, which controls the switches 109 and 110 as well as the operation of the orthogonal transform coefficient integration unit 104; a state registration unit 107 connected with the control unit 108; and an image display device 111 connected with the image integration unit 106.

In this image signal decoding apparatus, the orthogonal transform coefficient decoding unit 101 sequentially decodes the encoded signals received from an image signal encoding apparatus (not shown) through the signal transmission line (not shown) so as to recover the quantized orthogonal transform coefficients, and inverse quantizes the quantized orthogonal transform coefficients so as to recover the orthogonal transform coefficients.

More specifically, as shown in FIG. 5, the orthogonal transform coefficient decoding unit 101 includes a decoder 201 for decoding the encoded signals to obtain the quantized orthogonal transform coefficients; and an inverse quantizer 202 for inverse quantizing the quantized orthogonal transform coefficients obtained by the decoder 201 to obtain the orthogonal transform coefficients.

The recovered orthogonal transform coefficients obtained by the orthogonal transform coefficient recovering unit 101 are temporarily stored in the buffer 102, until they are transmitted to either the orthogonal transform coefficient integration unit 104 or the inverse orthogonal transform unit 105 through the switches 109 and 110 controlled by the control unit 108. This buffer 102 has a capacity for storing the orthogonal transform coefficients for at most M blocks, and outputs the stored orthogonal transform coefficients in the First-In First-Out mode.

On the other hand, the counter 103 counts a number of blocks temporarily stored in the buffer 102, and supplies this number of blocks to the control unit 108. Thus, the count by the counter 103 is increased by one when the buffer 102 receives the orthogonal transform coefficients for one block, and is decreased by one when the buffer 102 outputs the orthogonal transform coefficients for one block.

The control unit 108 controls the switches 109 and 110 according to the number of blocks stored in the buffer 102 such that the orthogonal transform coefficients stored in the buffer 102 are processed either in an orthogonal transform coefficient mode by being integrated at the orthogonal transform coefficient integration unit 104 when the number of blocks stored in the buffer 102 is greater than or equal to a prescribed threshold value Mth (0<Mth <M), or in a picture element mode by being applied with the inverse orthogonal transform immediately at the inverse orthogonal transform unit 105 when the number of blocks stored in the buffer 102 is less than the prescribed threshold value Mth, so as to recover the interframe differential signals. In transiting from the orthogonal transform coefficient mode to the picture element mode as the number of blocks stored in the buffer 102 turns from greater than or equal to the prescribed threshold value Mth to less than the prescribed threshold value Mth, the integrated orthogonal transform coefficients integrated in the orthogonal transform coefficient integration unit 104 are transmitted to the inverse orthogonal transform unit 105 and applied with the inverse orthogonal transform at the inverse orthogonal transform unit 105.

In accordance with such a controlling by the control unit 108, the orthogonal transform coefficient integration unit 104 is also controlled by the control unit 108 to operate in either one of an initial operation mode and a continuing operation mode. The initial operation mode is an operation mode adopted in transiting from the picture element mode of processing to the orthogonal transform coefficient mode of processing, while the continuing operation mode is an operation mode adopted in continuing the orthogonal transform coefficient mode of processing.

More specifically, as shown in FIG. 6, the orthogonal transform coefficient integration unit 104 comprises: an adder 301 that can be connected with the switch 109 through a switch 303; and an orthogonal transform coefficient memory 302 that can be connected with either the adder 301 through a switch 304 or the switch 109 through the switches 303 and 304, which has a capacity for storing all the orthogonal transform coefficients for all of the blocks within a single frame, and from which the integrated orthogonal transform coefficients are outputted.

In the initial operation mode, the switches 303 and 304 are closed at junctions A, such that the orthogonal transform coefficient memory 302 is directly connected with the switch 109. In this initial operation mode, the orthogonal transform coefficients for a certain block transmitted through the switch 109 are overwritten into a corresponding area for that block in the orthogonal transform coefficient memory 302.

In the continuing operation mode, the switches 303 and 304 are closed at junctions b such that the adder 301 is connected with the switch 109 and the orthogonal transform coefficient memory 302 is connected with the adder 301. In this continuing operation mode, the orthogonal transform coefficients for a certain block transmitted through the switch 109 are added to the orthogonal transform coefficients for that block stored in the orthogonal transform coefficient memory 302 read out from the corresponding area for that block by the adder 301 so as to update the integrated orthogonal transform coefficients for that block. The integrated orthogonal transform coefficients updated by the adder 301 are then overwritten into the corresponding area for that block in the orthogonal transform coefficient memory 302.

Now, in controlling the switches 109 and 110 and the orthogonal transform coefficient integration unit 104, the control unit 108 also utilizes state information concerning the processing mode by which the orthogonal transform coefficients for each block within the frame have been processed at an immediately preceding processing occasion, which is registered at the state registeration unit 107 in a form of a table having as many entries as the number of blocks within the frame.

Figures 8, 9:
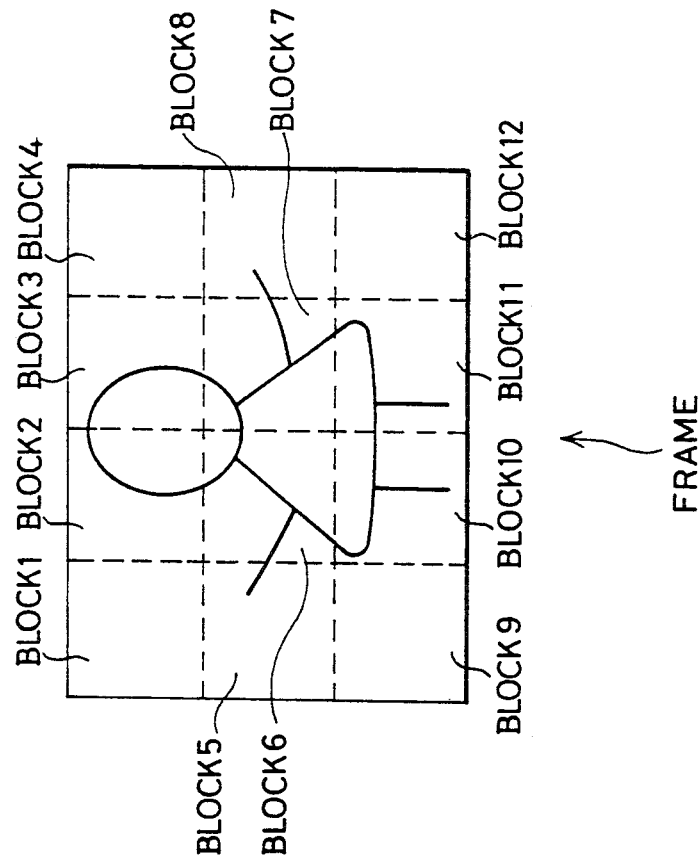
FIG. 8 is an illustration of a table memorized in a state registration unit of the image signal decoding apparatus of FIG. 4.
FIG. 9 is a detail block diagram of an image integration unit in the image signal decoding apparatus of FIG. 4.

Namely, in a case where each frame is formed by twelve blocks as shown in FIG. 7 for example, the state registration unit 107 memorizes the state information in a form of a table shown in FIG. 8 which has twelve entries corresponding to the twelve blocks of the frame. In this state registration unit 107, an entry "0" in the processing mode column for a certain block indicates that the processing mode by which the orthogonal transform coefficients for that block have been processed at an immediately preceding processing occasion was the picture element mode, while an entry "1" in the processing mode column for a certain block indicates that the processing mode by which the orthogonal transform coefficients for that block have been processed at an immediately preceding processing occasion was the orthogonal transform coefficient mode. Thus, for instance, the table shown in FIG. 8 indicates that the block 1 was previously processed in the picture element mode, the block 2 was previously processed in the orthogonal transform coefficient mode, and so on.

The control unit 108 controls the switches 109 and 110 and the orthogonal transform coefficient integration unit 104 by utilizing the number of blocks stored in the buffer 102 which is counted by the counter 103 and the processing mode at an immediately preceding processing occasion for the orthogonal transform coefficients outputted by the buffer 102 which is indicated by the state information memorized in the state registration unit 107, such that the orthogonal transform coefficients outputted by the buffer 102 can be processed by an appropriate one of the picture element mode and the orthogonal transform coefficient mode, as follows.

(1) Case of Counter 103's Count <Mth Picture Element Mode (i) When the processing mode at an immediately preceding processing occasion for the orthogonal transform coefficients to be processed was the picture element mode, the switches 109 and 110 are closed at junctions a, such that the inverse orthogonal transform unit 105 is directly connected with the buffer 102.

In this case, the orthogonal transform coefficients outputted by the buffer 102 are directly transmitted to the inverse orthogonal transform unit 105, and the processing mode entry for the relevant block in the state registration unit 107 is updated to an entry "0" indicating the picture element mode.

(ii) When the processing mode at an immediately preceding processing occasion for the orthogonal transform coefficients to be processed was the orthogonal transform coefficient mode, the switch 109 is closed at a junction b while the switch 110 is closed at a junction c, such that the orthogonal transform coefficient integration unit 104 is connected with the buffer 102 and the inverse orthogonal transform unit 105 is connected with the orthogonal transform coefficient integration unit 104.

In this case, the orthogonal transform coefficients outputted by the buffer 102 are transmitted to the orthogonal transform coefficient integration unit 104, and the orthogonal transform coefficient integration unit 104 is operated in the continuing operation mode so as to update the orthogonal transform coefficients in the orthogonal transform coefficient memory 302 of the orthogonal transform coefficient integration unit 104.

Then, the integrated orthogonal transform coefficients outputted from the orthogonal transform coefficient memory 302 of the orthogonal transform coefficient integration unit 104 are transmitted to the inverse orthogonal transform unit 105, while the processing mode entry for the relevant block in the state registration unit 107 is updated to an entry "0" indicating the picture element mode.

(2) Case of Counter 103's Count ≧ Mth Orthogonal Transform Coefficient Mode (i) When the processing mode at an immediately preceding processing occasion for the orthogonal transform coefficients to be processed was the picture element mode, the switches 109 and 110 are closed at junctions b, such that the orthogonal transform coefficient integration unit 104 is connected with the buffer 102.

In this case, the orthogonal transform coefficients outputted by the buffer 102 are transmitted to the orthogonal transform coefficient integration unit 104, and the orthogonal transform coefficient integration unit 104 is operated in the initial operation mode so as to reset the orthogonal transform coefficients in the orthogonal transform coefficient memory 302 of the orthogonal transform coefficient integration unit 104. Then, the processing mode entry for the relevant block in the state registration unit 107 is updated to an entry "1" indicating the orthogonal transform coefficient mode.

(ii) When the processing mode at an immediately preceding processing occasion for the orthogonal transform coefficients to be processed was the orthogonal transform coefficient mode, the switches 109 and 110 are closed at junctions b, such that the orthogonal transform coefficient integration unit 104 is connected with the buffer 102.

In this case, the orthogonal transform coefficients outputted by the buffer 102 are transmitted to the orthogonal transform coefficient integration unit 104, and the orthogonal transform coefficient integration unit 104 is operated in the continuing operation mode so as to update the orthogonal transform coefficients in the orthogonal transform coefficient memory 302 of the orthogonal transform coefficient integration unit 104. Then, the processing mode entry for the relevant block in the state registration unit 107 is updated to an entry "1" indicating the orthogonal transform coefficient mode.

The inverse orthogonal transform unit 105 applies the inverse orthogonal transform to the orthogonal transform coefficients transmitted directly from the buffer 102 in a case (i) of (1) described above, or the integrated orthogonal transform coefficients transmitted from the orthogonal transform coefficient integration unit 104 in a case (ii) of (1) described above, so as to recover the interframe differential signals. Here, accordingly, the recovered interframe differential signals represent the interframe differences with respect to the frame in which the relevant block was last processed by the picture element mode.

The recovered interframe differential signals obtained by the inverse orthogonal transform unit 105 are transmitted to the image integration unit 106 at which the new reproduced image signals are obtained by adding the recovered interframe differential signals with the preceding frame image signals.

More specifically, as shown in FIG. 7, the image integration unit 106 comprises an adder 401 connected with the inverse orthogonal transform unit 105; and a frame memory 402 connected with the adder 401, from which the reproduced image signals are outputted. The interframe differential signals transmitted from the inverse orthogonal transform unit 105 are added to the preceding frame image signals stored in and read out from the frame memory 402 by the adder 401 so as to obtain the new reproduced image signals. The new reproduced image signals obtained by the adder 401 are then overwritten into the frame memory 402. Here, the image signals stored in the frame memory 402 represent the frame in which each block is that which was last processed by the picture element mode. Since, the processing mode is changed independently for each block in this image signal decoding apparatus, the frame on the frame memory 402 may contain the blocks originating from different frames in the input image signals.

The image signals reproduced at the image integration unit 106 are then transmitted sequentially at the timing provided by the clock signals to the image display device 111 so as to display the image given by the reproduced image signals. Here, for a block which is currently being processed by the orthogonal transform coefficient mode, the image given by the image signals of a frame in which this block was last processed by the picture element mode is displayed, so that the image display by the image display unit 111 may contain the blocks originating from different frames in the input image signals.

As described, according to this embodiment, the integration of the information on the interframe differences is carried out in the pel (picture element) domain, just as in the decoding loop in the image signal encoding apparatus, in a case where the number of input blocks per unit time is not excessive, so that an error due to the difference between the mode of the integration of the information on the interframe differences in the decoding loop of the image signal encoding apparatus and in the image signal decoding apparatus can be avoided in such a case where.

On the other hand, in a case the number of input blocks per unit time is excessive, the information on the interframe differences is constantly integrated in the transform domain, so that the image quality will be temporarily deteriorated while the number of input blocks per unit time is excessive, but the reproduction of the image signals with the high image quality can be resumed immediately when the number of input blocks per unit time turns to be not excessive, and therefore it is sufficient in this image signal decoding apparatus to employ a relatively low speed inverse orthogonal transform device.

It is to be noted that the image signal decoding apparatus of the present invention can be applied advantageously to an apparatus for receiving multiple channels of motion video signals such as a multi-point TV conference apparatus, in which it is necessary to decode the multiple channels of the motion video signals simultaneously and for this reason the decoder is shared among a plurality of channels.

In this case, the decoding operation can be carried out by using the picture element mode while the burden of the decoding operation is not so heavy, and the decoding operation can be carried out by using the orthogonal transform coefficient mode when the burden of the decoding operation becomes heavy. In this manner, it is unnecessary to discard a part of the encoded signals for the purpose of reducing the burden of the decoding operation, so that the deterioration of the image quality due to the sharing of a decoder among a plurality of channels can be avoided.

It is also to be noted that, in the embodiment described above, if the image signal encoding apparatus from which the encoded signals are entered is a type which outputs not only the significant blocks but also the insignificant blocks as well, an additional function to discard the insignificant input blocks may be provided in the orthogonal transform coefficient decoding unit 101.

Besides this, many modifications and variations of the above embodiment may be made without departing from the novel and advantages features of the present invention. Accordingly, all such modifications and variations are intended to be included within the scope of the appended claims.

What is claimed is:

1. Am image signal decoding apparatus for decoding input encoded signals encoded by using an orthogonal transform of interframe differential signals of image signals, comprising:

means for recovering orthogonal transform coefficients for the interframe differential signals from the input encoded signals;

means for integrating interframe difference information by using the orthogonal transform coefficients for the interframe differential signals recovered by the recovering means in order to reproduce the image signals, the integrating means being capable of operating in two processing modes including:

a first processing mode for applying an inverse orthogonal transform to the orthogonal transform coefficients in order to recover the interframe differential signals, and then integrating the interframe difference information by using the recovered interframe differential signals on a pel domain defined in terms of picture elements; and a second processing mode for integrating the interframe difference information by using the orthogonal transform coefficients on a transformed domain defined in terms of the orthogonal transform coefficients; and means for controlling the integrating means to operate in the first processing mode in a case where a number of input blocks per unit time in the input encoded signals is less than a prescribed threshold value, and in the second processing mode in a case where the number of input blocks per unit time in the input encoded signals is not less than a prescribed threshold value.

2. The image signal decoding apparatus of claim 1, wherein the integrating means includes:

orthogonal transform coefficient integration means for integrating the orthogonal transform coefficients in order to obtain integrated orthogonal transform coefficients in the second processing mode;

inverse orthogonal transform means for applying the inverse orthogonal transform to the orthogonal transform coefficients recovered by the recovering means in order to recover the interframe differential signals in the first processing mode, and applying the inverse orthogonal transform to the integrated orthogonal transform coefficients obtained by the orthogonal transform coefficient integration means in order to recover the interframe differential signals in transiting from the second processing mode to the first processing mode; and image integration means for integrating the interframe differential signals recovered by the inverse orthogonal transform means in order to reproduce the image signals.

3. The image signal decoding apparatus of claim 2, wherein the orthogonal transform coefficient integration means includes:

memory means for memorizing the integrated orthogonal transform coefficients; and adder means for updating the integrated orthogonal transform coefficients memorized in the memory means by adding the orthogonal transform coefficients recovered by the recovering means to the integrated orthogonal transform coefficients in the memory means.

4. The image signal decoding apparatus of claim 3, wherein the orthogonal transform coefficient integration means is capable of operating in two operation modes including:
   an initial operation mode in which the integrated orthogonal transform coefficients memorized in the memory means is reset by the orthogonal transform coefficients recovered by the recovering means; and
   a continuing operation mode in which the integrated orthogonal transform coefficients memorized in the memory means is updated by adding the orthogonal transform coefficients recovered by the recovering means at the adder means.

5. The image signal decoding apparatus of claim 4, wherein the controlling means also controls the orthogonal transform coefficient integration means to operate in the initial operation mode in transiting the processing mode of the integrating means from the first processing mode to the second processing mode, and in the continuing operation mode in transiting the processing mode of the integrating means from the second processing mode to the first processing mode as well as in maintaining the second processing mode of the integrating means.

6. The image signal decoding apparatus of claim 5, wherein the controlling means controls the orthogonal transform coefficient integration means by using a state information concerning the processing mode of the integrating means by which the orthogonal transform coefficients for each block of the input encoded signals have been processed at an immediately preceding processing occasion.

7. The image signal decoding apparatus of claim 1, wherein the recovering means includes:
   decoder means for decoding the input encoded signals; and
   inverse quantizer means for inverse quantizing the input encoded signals decoded by the decoder means to obtain the orthogonal transform coefficients.

8. The image signal decoding apparatus of claim 1, further comprising buffer means for storing the orthogonal transform coefficients recovered by the recovering means for a predetermined period of time before transmitting the orthogonal transform coefficients to the integrating means.

9. The image signal decoding apparatus of claim 8, wherein the controlling means monitors the number of input blocks per unit time in the input encoded signals by counting a number of blocks stored in the buffer means.

10. The image signal decoding apparatus of claim 2, wherein the image integration means further includes:
    frame memory means for memorizing the integrated interframe differential signals as the image signals reproduced by the image signal decoding apparatus; and
    adder means for updating the integrated interframe differential signals memorized in the frame memory means by adding the interframe differential signals recovered by the inverse orthogonal transform means to the integrated interframe differential signals in the frame memory means.

11. An image signal decoding method for decoding input encoded signals encoded by using an orthogonal transform of interframe differential signals of image signals, comprising the steps of:
    recovering orthogonal transform coefficients for the interframe differential signals from the input encoded signals; and
    integrating interframe difference information by using the orthogonal transform coefficients for the interframe differential signals recovered at the recovering step in order to reproduce the image signals, the integrating step being carried out in one of two processing modes including:
    a first processing mode for applying an inverse orthogonal transform to the orthogonal transform coefficients in order to recover the interframe differential signals, and then integrating the interframe difference information by using the recovered interframe differential signals on a pel domain defined in terms of picture elements, in a case where a number of input blocks per unit time in the input encoded signals is less than a prescribed threshold value; and
    a second processing mode for integrating the interframe difference information by using the orthogonal transform coefficients on a transformed domain defined in terms of the orthogonal transform coefficients, in a case where the number of input blocks per unit time in the input encoded signals is not less than a prescribed threshold value.

12. The image signal decoding method of claim 11, wherein the integrating step includes the steps of:
    orthogonal transform coefficient integration step for integrating the orthogonal transform coefficients in order to obtain integrated orthogonal transform for coefficients in the second processing mode;
    inverse orthogonal transform step for applying the inverse orthogonal transform to the orthogonal transform coefficients recovered at the recovering step in order to recover the interframe differential signals in the first processing mode, and applying the inverse orthogonal transform to the integrated orthogonal transform coefficients obtained at the orthogonal transform coefficient integration step in order to recover the interframe differential signals in transiting from the second processing mode to the first processing mode; and
    image integrating step for integrating the interframe differential signals recovered at the inverse orthogonal transform step in order to reproduce the image signals.

13. The image signal decoding method of claim 12, wherein the orthogonal transform coefficient integration step includes the steps of:
    memorizing the integrated orthogonal transform coefficients in memory means; and
    updating the integrated orthogonal transform coefficients memorized in the memory means by adding the orthogonal transform coefficients recovered at the recovering step to the integrated orthogonal transform coefficients in the memory memory.

14. The image signal decoding method of claim 13, wherein the orthogonal transform coefficient integration step is carried out in one of two operation modes including:

an initial operation mode in which the integrated orthogonal transform coefficients memorized in the memory means is reset by the orthogonal transform coefficients recovered at the recovering step; and a continuing operation mode in which the integrated orthogonal transform coefficients memorized in the memory means is updated by adding the orthogonal transform coefficients recovered at the recovering step.

15. The image signal decoding method of claim 14, wherein the orthogonal transform coefficient integration step is operated in the initial operation mode in transiting the processing mode of the integrating step from the first processing mode to the second processing mode, and in the continuing operating mode in transiting the processing mode of the integrating step from the second processing mode to the first processing mode as well as in maintaining the second processing mode of the integrating step.

16. The image signal decoding method of claim 15, wherein the orthogonal transform coefficient integration step is carried out by using a state information concerning the processing mode of the integrating step by which the orthogonal transform coefficients for each block of the input encoded signals have been processed at an immediately preceding processing occasion.

17. The image signal decoding method of claim 11, wherein the recovering step includes the steps of:
    decoding the input encoded signals; and
    inverse quantizing the input encoded signals decoded at the decoding step to obtain the orthogonal transform coefficients.

18. The image signal decoding method of claim 11, further comprising the step of storing the orthogonal transform coefficients recovered at the recovering step for a predetermined period of time by buffer means before processing the orthogonal transform coefficients at the integrating step.

19. The image signal decoding method of claim 18, wherein the number of input blocks per unit time in the input encoded signals is monitored by counting a number of blocks stored in the buffer means.

20. The image signal decoding method of claim 12, wherein the image integration step further includes the steps of:
    memorizing the integrated interframe differential signals by frame memory means as the image signals reproduced by the image signal decoding method; and
    updating the integrated interframe differential signals memorized in the frame memory means by adding the interframe differential signals recovered at the inverse orthogonal transform step to the integrated interframe differential signals in the frame memory means.

* * * * *